United States Patent [19]

Hollis et al.

[11] 4,174,610

[45] Nov. 20, 1979

[54] POWER CRUISE DIVERTER VALVE

[75] Inventors: Thomas J. Hollis, Fairport, N.Y.; William F. Thornburgh, Rochester, Mich.

[73] Assignee: General Motors Corporation, Detroit, Mich.

[21] Appl. No.: 901,569

[22] Filed: May 1, 1978

[51] Int. Cl.² ............................................. F01N 3/10
[52] U.S. Cl. ................................................ 60/290
[58] Field of Search ............................... 60/289, 290

[56] References Cited

U.S. PATENT DOCUMENTS

| | | | |
|---|---|---|---|
| 3,924,409 | 12/1975 | Heilman | 60/290 |
| 3,934,413 | 1/1976 | Beiswenger | 60/289 |
| 3,950,943 | 4/1976 | Paddock | 60/290 |
| 4,070,830 | 1/1978 | Beiswenger | 60/290 |

Primary Examiner—Douglas Hart
Attorney, Agent, or Firm—Arthur N. Krein

[57] ABSTRACT

An air control valve for use in the exhaust emission control system of an internal combustion engine as used for example, in a vehicle, the air control valve, which is adapted to perform three functions, includes a divert timing switching diaphragm assembly which provides the standard diverter valve function during engine warmup and also controls port air injection during all mid-power conditions, a second diaphragm valve assembly that is operative to provide for secondary air by-pass during high engine load or power operating conditions and, a third diaphragm valve assembly adapted to provide secondary air by-pass during low engine load or vehicle cruise conditions.

2 Claims, 3 Drawing Figures

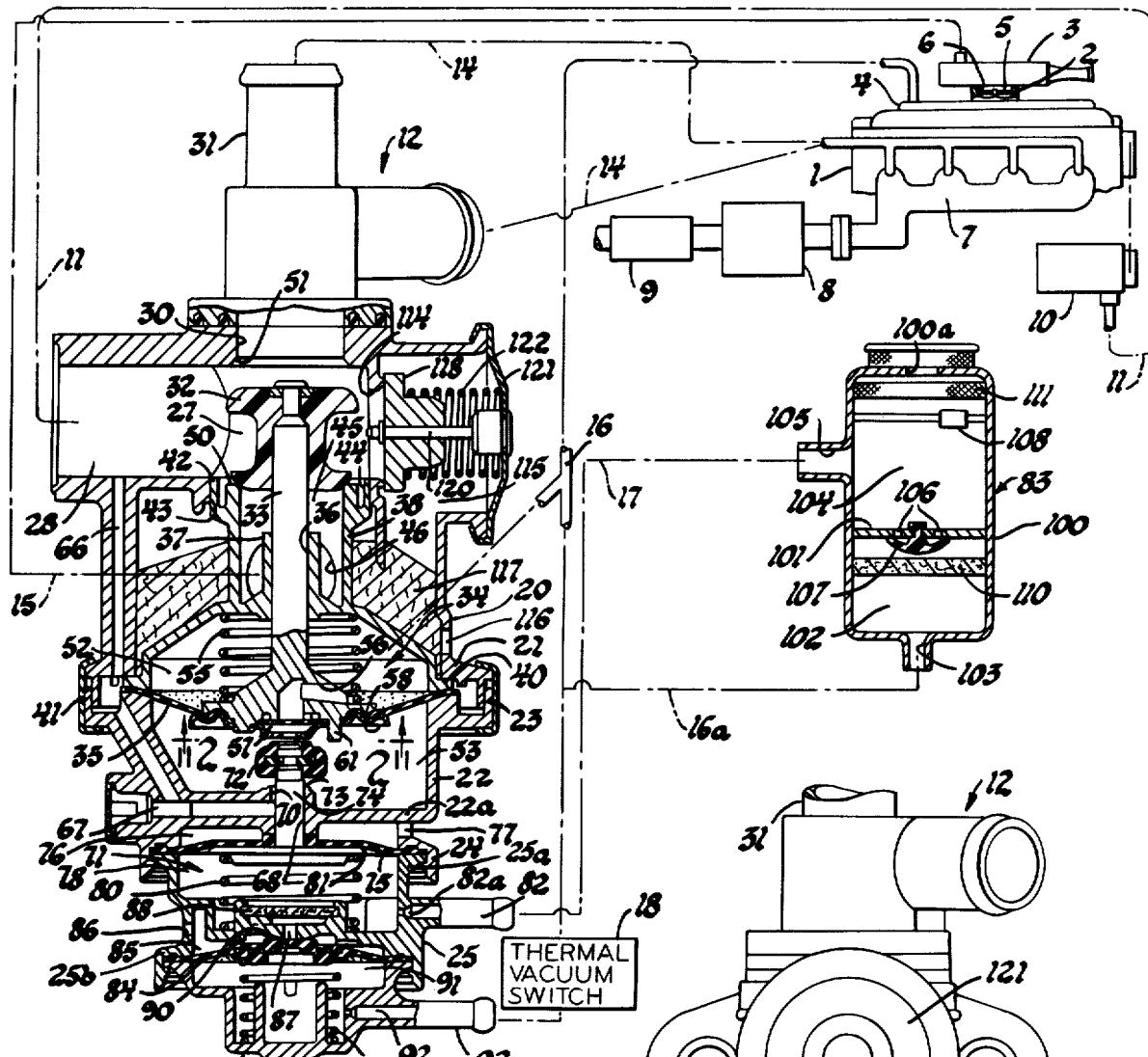

POWER CRUISE DIVERTER VALVE

FIELD OF THE INVENTION

This invention relates to an air flow control value for use in an exhaust emission control system of the type wherein secondary air, from an air pump is delivered to the exhaust system of a vehicle mounted internal combustion engine and, in particular, to a power cruise diverter valve for selectively switching the flow of secondary air out through either of two outlets from the valve in a predetermined manner as a function of engine operation.

It has been found in emission control systems for internal combustion engines of the type which include an air injection device for introducing secondary air into the exhaust system, preferably closely adjacent to the exhaust ports of the engine, that for efficient and trouble free operation, it is necessary that the delivery of secondary air to the exhaust ports be suitably controlled by an air control or diverter valve structure so that air is not continuously delivered into the exhaust ports during all modes of engine operation. Instead, it has been found necessary that such secondary air should only be delivered to the exhaust ports during certain modes of engine operation, and, at all other times the secondary air should be diverted.

DESCRIPTION OF THE PRIOR ART

Suitable air flow control valves to provide some of the above described functions are disclosed, for example, in United States patent applications Ser. No. 735,047 entitled "Integral Air Switching Diverter Valve" filed Oct. 27, 1976 in the name of David W. Beiswenger and Ser. No. 851,180 entitled "Power Mode Air Switching Diverter Valve" filed Nov. 14, 1977 in the name of John E. Jones, and assigned to a common assignee.

Although the air flow control valves disclosed in the above identified patent applications are suitable for use in exhaust emission control systems for specific engine classes in order to meet certain emission standards, they may not be most advantageous in certain other systems since their use may result in a sacrifice in fuel economy.

SUMMARY OF THE INVENTION

The present invention relates to an air control valve for use in the emission control system of an internal combustion engine for controlling or directing the flow of secondary air as supplied, for example, by an engine driven air pump, whereby under certain engine operating conditions the secondary air is delivered into the engine exhaust system, preferably this air being discharged into the exhaust manifold means of the engine next adjacent to the exhaust ports of the engine and, under other engine operating conditions, the secondary air is diverted, for example to the atmosphere, as by having this air discharged to the dirty side of the air filter in the usual air cleaner for the engine air intake system.

It is therefore a primary object of this invention to provide an air control valve for use in the exhaust emission control system of an internal combustion engine whereby the air control valve that is operative to divert or provide air by-pass during predetermined modes of engine operation so as to effect improved fuel economy of the engine and to prevent excessive heat buildup in the exhaust emission control system.

Another object of this invention is to provide an air control valve for use in an exhaust emission control system for an internal combustion engine that is operative during low engine load or vehicle cruise conditions to divert or by-pass secondary air, as to the atmosphere, whereby to provide improved fuel economy under highway cruise operating conditions of the engine.

For a better understanding of the invention as well as other objects and further features thereof, reference is had to the following detailed descriptions of the invention to be read in connection with the accompanying drawings.

DESCRIPTION OF THE DRAWINGS

FIG. 1 is a schematic view of an internal combustion engine and a portion of the exhaust emission control system therefore that includes an air pump and a power cruise diverter valve in accordance with the invention, this valve assembly being shown in enlarged sectional view;

FIG. 2 is a view taken along line 2—2 of FIG. 1 showing the divert timing valve arrangement; and, FIG. 3 is a right hand side elevational view of the power cruise diverter valve of FIG. 1.

DESCRIPTION OF THE PREFERRED EMBODIMENT

Referring now to FIG. 1, an internal combustion engine 1 is provided, for example, with a carburetor 2 and an air cleaner 3 mounted thereon for supplying induction fluid to the intake manifold 4 of the engine, primary air flow through the carburetor to the engine being controlled by a throttle valve 5 pivotably mounted within the induction passage 6 extending through the carburetor. An exhaust manifold 7 receives the exhaust gasses discharged through the exhaust ports (not shown) from the cylinders (not shown) in one bank of the engine and defines a flow path for the combustible exhaust gasses discharged therefrom. Each exhaust manifold 7, in the construction illustrated, is suitably connected to a catalytic converter 8 and a muffler 9.

An air pump, such as an engine driven air pump 10, delivers clean secondary air by a conduit 11 to a power cruise diverter valve, generally designated 12, in accordance with the invention, which is operative in a manner to be described to control delivery of secondary air either through conduits 14 to the exhaust manifolds 7 for discharge of this air closely adjacent to the exhaust ports (not shown) of the engine on the downstream side thereof, or, to divert or by-pass this air, for example, to the atmosphere as by discharging this secondary air through a conduit 15 connected to the air cleaner 3 for discharge therein on the dirty side of the usual air filter (not shown) positioned therein.

The power cruise diverter valve 12, in the construction shown, includes a multiple piece housing having, as major elements thereof, an upper body 20 provided with a lower flange 21, an intermediate or divert timing body 22 provided with upper and lower flanges 23 and 24, respectfully, a lower body 25 and a lower cup-shaped cover 26, these elements being suitably secured together in a manner to be described.

The upper body 20 is formed with a central stepped opening extending upward from the lower portion thereof, to provide a central or valve chamber 27 adjacent to the upper end thereof. A lateral air inlet passage 28 is provided in the upper body 20 for connection at one end to the conduit 11 and has its other end opening into the valve chamber 27. A primary discharge or outlet passage 30 is provided in the upper body 20 and has one end thereof opening into the valve chamber 27 and has its other end connected, in the construction shown, by a two outlet, conduit coupling 31 for connection by the conduits 14 to the exhaust manifolds 7.

A valve member 32 is movably positioned in the valve chamber 27 and is secured to the upper end of a valve stem 33, the lower end of this valve stem being suitably secured to a switching or divert timing diaphragm assembly, generally designated 34, and in particular, to the switching diaphragm 35 of this assembly. The valve stem 33 is sealingly guided for reciprocable movement in the valve guide bore 36 provided in the central guide portion 37 of an insert member 38 which is secured about its lower rim together with the outer peripheral edge of the diaphragm 35 between the lower rim 21 of upper body 20 and the upper flange 23 of the divert timing body 22, these elements being secured together, in the construction illustrated, by means of a conventional band clamp 41. In addition, the upper rim 42 of insert member 38 is pressed into the bore portion 43 of upper body 20, a deep groove 44 in the upper rim 42 facilitating this press fit.

Insert member 38 has a cylindrical recess surrounding the guide portion 37 to provide an air divert passage 45 that is in communication via a lateral port 46 with a second lateral or outlet passage 47 provided in the upper body 20 which is connected for flow communication, by the conduit 15, to the air cleaner 3. The air divert passage 45, lateral port 46, and outlet passage 47 form, in effect, a secondary discharge passage or outlet for the subject valve assembly.

The upper periphery of the insert member 38 surrounding the air divert passage 45 defines a lower valve seat 50 which is engageable by the valve member 32, this lower valve seat 50 being positioned in axial alignment, relative to the axis of valve stem 33, with an upper valve seat 51 surrounding the lower end of outlet passage 30.

The switching diaphragm 35 forms with the lower end of the insert member 38 in upper body 20, an upper or vacuum chamber 52 and forms with the divert timing body 22 and an air diverter valve or control chamber 53. The upper chamber 52 is referred to as a vacuum chamber since this chamber is connected by a fitting 54, as seen in FIG. 3, formed as a portion of insert member 38, that extends through a suitable aperture in the upper body 20, for connection by a branched vacuum conduit 16 to the intake manifold 4 of the engine whereby induction manifold pressure, downstream of throttle valve 5, can be applied to this chamber. A coil spring 55 positioned in vacuum chamber 52 operatively engages the switching diaphragm 35 and valve stem 33 to normally bias valve member 32 to a position, the position shown in FIG. 1, at which this valve member engages valve seat 50 blocking flow out through the air divert passage 45 while permitting flow out through the outlet passage 30.

Valve stem 33, at its lower end with reference to FIG. 1, has a passage 56 therein that is used to place the vacuum chamber 52 in fluid communication with the control chamber 53, a flat type check valve 57 being disposed to regulate flow through the passage 56 into the control chamber 53. The details of the check valve 57 are shown more clearly in FIG. 2. As shown, a diaphragm retainer 58 is positioned under switching diaphragm 35 and it is provided with a plurality of apertures 60 which receive the alignment pins 61 formed on the lower portion of the valve stem 33. As shown, at least four of these alignment pins 61a are riveted under so as to secure the diaphragm retainer 58 to the valve stem 33 with a portion of the switching diaphragm 35 sandwiched therebetween. The outer rim of the check valve 57 is supported by an annular portion of the diaphragm retainer 58 next adjacent to the centrally embossed apertured portion 58a thereof. A flapper valve in the form of a central flap 62 of the check valve 57 overlies an annular valve seat 63 formed in the base of valve stem 33. A timing orifice, in the form of a notch 64, is coined in the seat 63. During the period when manifold vacuum in vacuum chamber 52 is increasing, flow from control chamber 53 is restricted to pass only through the notch 64. Thus, the volume of the control chamber 53 and the size of the notch 64 determine the time required for the pressure in control chamber 53 to be reduced to the point where spring 55 will lower switching diaphragm 35 and valve stem 33, with the valve member 32 thereon to a closed position relative to valve seat 50, the position shown in FIG. 1. During a period of increasing pressure in vacuum chamber 52, the central flap 62 will be pushed downwardly to allow unrestricted flow from the vacuum chamber 52 to control chamber 53.

The portion of the power cruise diverter valve 12, thus far described, is similar to a conventional air diverter valve of the type disclosed, for example, in U.S. Pat. Nos. 3,950,943 entitled "Air Diverter Valve" issued Apr. 30, 1976 to Gordon R. Paddock and Ernst L. Ranft, and 3,905,193 entitled "Air Diverter Valve and Controlling Means Therefor" issued Sept. 16, 1975 to Gerald D. Heilman and Gordon R. Paddock, the disclosures of which are incorporated herein by reference thereto.

Now in accordance with the invention, the control chamber 53 may also be referred to as an actuating or diverter valve chamber, since it can also be placed in flow communication with the air inlet passage 28 whereby air at air pump 10 discharge pressure can be admitted to the control chamber 53 to effect movement of valve member 32 to a divert position, that is to a position permitting flow of secondary air into air divert passage 45 for flow to the atmosphere. For this purpose, in the embodiment shown, there is provided a pressure conduit passage means that includes a conduit passage 66 in upper body 20, which is in flow communication with air inlet passage 28 and with one end of a conduit passage 67 provided in divert timing body 22, the opposite end of conduit passage 67 opening into an axial bore 68 extending through the base wall 22a of the body 22, adjacent to a grooved orifice passage 70, provided in the upper end of the annular wall defining bore 68 that opens into control chamber 53.

Flow of pressurized air from the air pump 10 through the above described pressure conduit passage means to the control chamber 53 is controlled by a power mode diaphragm actuated valve assembly 71 that includes a valve member 72 positioned in control chamber 53 for movement between an open position, as shown, permitting flow through the orifice passage 70 into control chamber 53 and a closed position at which the lower end of valve member 72 is seated against the valve seat 73 encircling the upper end of bore 68 and a portion of orifice passage 70.

As shown, valve member 72 is fixed to one end of a valve stem 74 slidably received in bore 68, the oppposite end of valve stem 74 having a power mode actuator diaphragm 75 fixed thereto. Diaphragm 75 has its outer edge portion sandwiched between the lower flange 24 of divert timing body 22 and the upper flange 25a of lower body 25, a portion of flange 24 being spun over, for example, to secure these elements together. With this arrangement, diaphragm 75 forms an atmospheric pressure chamber 76 with the lower portion of divert timing body 22 that is in communication with the atmosphere via one or more ports 77 in the side wall of this body 22, while the opposite or lower side of diaphragm 75 forms a power diaphragm chamber or vacuum chamber 78 with the upper portion of lower body 25.

A calibrated coil spring 80, of predetermined force, is positioned in the vacuum chamber 78 with one end thereof abutting against an inner surface of the lower body 25 and its other end abutting against a diaphragm retainer 81 fixed to valve stem 74 below diaphragm 75, whereby to normally bias the valve member 72 to its open position. For movement of valve member 72 toward its closed position, vacuum chamber 78 is placed in communication by a passage fitting 82, with a control orifice passage 82a therein, connected, in the system illustrated, by a conduit 17, a differential vacuum delay valve 83 and a branch conduit 16a to vacuum conduit 16 for receiving a control pressure signal.

In accordance with the invention, vacuum chamber 78 is also supplied with atmospheric air during certain modes of engine operation, as described hereinafter, whereby the pressure on opposite sides of diaphragm 75 can be substantially equalized to some predetermined value. For this purpose, a third diaphragm, which may be referred to as a cruise control diaphragm 84, has its outer rim portion sandwiched between a lower flange 25b of lower body 25 and the upper rim of cover 26, a portion of flange 25b being spun over, for example, to retain these elements in unit assembly.

The upper surface of diaphragm 84 forms with the lower portion of lower body 25 a pressure chamber 85 which is open to the atmosphere via one or more ports 86 in the side wall of lower body 25. A central stepped passage 87, with a filter disc 88 positioned therein, provides for fluid communication between the vacuum chamber 78 and the pressure chamber 85. Flow through the passage 87 is controlled by a valve member 90 which, in the construction illustrated, is formed as an integral central portion of diaphragm 84 for movement therewith. The lower or opposite surface of diaphragm 84 forms a vacuum chamber 91 with the cover 26, this vacuum chamber 91 being adapted to receive a vacuum signal during engine operation via a passage fitting 92 with a control orifice passage 92a therein connected by vacuum conduit 16 and a thermal vacuum switch 18 to receive an induction vacuum signal from downstream of throttle valve 5, in a manner to be described, to effect unseating or opening of the valve member 90 relative to the passage 87 to permit flow from chamber 85 to chamber 78. A calibrated spring 93, positioned in vacuum chamber 91 in abutment against diaphragm 84, normally biases the valve member 90 to a closed position, as shown, to block flow through the passage 87.

Referring now to the differential vacuum delay valve 83, shown schematically, it is, in effect, a control unit used to create a control pressure signal to vacuum chamber 78. In the construction illustrated, the differential vacuum delay valve 83 is of the type disclosed in U.S. Pat. No. 4,050,249 entitled "Control Unit" issued Sept. 27, 1977 to George R. Collins and William R. Large and includes a housing 100 which is divided by a partition 101 to form a chamber 102 which senses manifold induction pressure through aperture fitting 103 connected to conduit 16 via a conduit 16a and a chamber 104 which delivers the control pressure through aperture fitting 105 connected to conduit 17. Partition 101 has a plurality of apertures 106 which are controlled by an umbrella-type check valve 107 to permit flow from chamber 104 to chamber 102 but to inhibit flow from chamber 102 to chamber 104. One or more restrictor discs 108 provide a calibrated air bleed allowing a small flow of atmospheric air flowing through aperture 100a in the upper end of housing 100 to enter chamber 104. Suitable filter cartridges 110 and 111 are positioned within housing 100 adjacent to aperture fitting 103 and aperture 100a, respectively. For a more detailed description of the differential vacuum delay valve 83 and its mode of operation, reference is made to the above identified U.S. Pat. No. 4,050,249, the disclosure of which is incorporated herein by reference thereto.

Preferably, means are provided for the pressure relief of excess secondary air supplied to the power cruise diverter valve, as by having a pressure relief assembly, as shown, incorporated into the upper body 20 of the subject valve assembly 12. For this purpose, upper body 20 has a pressure relief passage 114 opening at one end into valve chamber 27 and at its opposite end into a side channel 115 that is in communication with the atmosphere via one or more side ports 116 extending through the outer wall of upper body 20. Suitable noise suppressor material 117 is positioned in the side channel 115 through which excess secondary flow prior to discharge out the side ports 116.

Flow through pressure relief passage 114 is controlled by a valve 118 which slides on a shaft 120 fixed at one end to a cover 121 suitably fixed to upper body 20. Valve 118 is normally biased to a position blocking flow through pressure relief passage 114 by a calibrated spring 122.

Before engine start up, all of the elements of the power cruise diverter valve 12 are in their respective positions shown in FIG. 1. Upon starting of the engine 1, assuming a cold start of the engine, the thermal vacuum switch 18, which is responsive to the operating temperature, for example, of the engine or exhaust system, prevents manifold vacuum from reaching vacuum chamber 91. Spring 93 is at that time operative to force the cruise control diaphragm 84 and the valve member 90 carried thereby into the position to block flow of atmospheric air from chamber 85 through passage 87 into vacuum chamber 78. At the same time, when engine 1 is operating under normal load, a manifold vacuum signal, as controlled by differential vacuum delay valve 83, is applied to vacuum chamber 78. Spring 80 is calibrated, for example, so that at 3" Hg or higher manifold vacuum levels, differential pressure across the power mode diaphragm 75 will effect movement of valve member 72 to its closed position, that is, to a position at which valve member 72 abuts against valve seat 73 blocking air flow through orifice passage 70 into the control chamber 53. At this time, the switching diaphragm assembly 34 provides the conventional diverter valve function during engine warm up and controls air injection to the exhaust manifolds 7 in a manner disclosed, for example, in the above identified U.S. Pat. No. 3,905,193.

In accordance with the invention, the power mode diaphragm actuator valve assembly 71 is operative to provide secondary air by-pass during high engine load or power conditions, that is, in the embodiment disclosed when the manifold vacuum is 3" Hg or less. This power mode diaphragm actuator valve assembly 71 provides a sealed diverter valve or control chamber 53. Spring 80, calibrated as above described, is operative to maintain the valve member 74 in a closed position blocking flow through orifice passage 70 during normal engine operation when the vacuum is 3" Hg or higher; but when the manifold vacuum drops below 3" Hg, that is below the calibration of spring 80, the spring 80 is operative to effect unseating of valve member 72 from valve seat 73 thus allowing air as supplied by air pump 10 to flow through the conduit passages 66, 67 and orifice passage 70 into the divert valve or control chamber 53 to act against diaphragm 35 thereby effecting movement of the valve element 32 into seating engagement with the upper valve seat 51 to thereby block flow out through outlet passage 30 while permitting secondary air flow out through the air divert passage 45. By thus diverting the air, excessive heat buildup in the exhaust manifolds is prevented and some power and fuel economy gains are also obtained since exhaust gas pressures are reduced and, since secondary air is diverted to the atmosphere engine losses to drive the air pump 10 are reduced.

The cruise control diaphragm 84 is operative, after engine warm up, to provide air by-pass during low engine load or vehicle cruise conditions, that is, when manifold vacuum in a particular embodiment is, for example, 8" Hg or higher. After engine warm up, thermal vacuum switch 18 is operative to permit a manifold vacuum signal to be applied to vacuum chamber 91. The cruise control diaphragm 84 provides a sealed power diaphragm or vacuum chamber 78 when manifold vacuum levels are lower than 8" Hg. However, when the manifold vacuum increases above 8" Hg, in effect above the calibration of spring 93, the cruise control diaphragm 84 will move downward from the position shown in FIG. 1 thereby moving valve member 90 to a position which permits venting or vacuum chamber 78 to the atmosphere whereby the pressure in the chamber 78 will drop to below 3" Hg, thereby permitting valve element 72 to move to its open position whereby air pump 10 pressure flowing into the control chamber 53 will again force the valve member 32 into a by-pass condition, that is, to a position allowing flow of secondary air out through the air divert passage 45 while blocking air flow out through the outlet passage 30. It will be apparent that with this latter operational feature whereby secondary air is by-passed during low engine load or vehicle cruise operating conditions, the fuel economy of the engine will be improved under normal highway cruise conditions.

It will be apparent that various modifications can be made to the subject power cruise diverter valve structure without departing from the scope of the invention. For example, although not shown, it is obvious that the one or more side ports 116 instead of being provided in the outer wall of upper body 20, as shown, could be provided in the portion of the outer wall of insert member 38 that surrounds the central guide portion 37, whereby excess secondary air, flow of which is controlled by the valve 118, can be discharged via the lateral port 46 and conduit 15 to the dirty side of the air cleaner 3. It will also be apparent that with this modifications, the noise suppressor material 117 could be eliminated.

The embodiments of the invention in which an exclusive property or privilege is claimed are defined as follows:

1. An air control valve for use with an internal combustion engine having an induction system, an exhaust emission control system including an exhaust manifold connected to the engine for receiving exhaust gases discharged from the exhaust ports of the engine and, a driven air pump for providing secondary air to the exhaust emission control system with flow thereto controlled by said air control valve, said air control valve including a housing means having a valve chamber therein with an inlet connectable to the air pump, a first outlet connectable to the exhaust emission control system and a second outlet adapted for discharging secondary air to the atmosphere, said housing means further including a first valve seat in said valve chamber surrounding said first outlet and a second valve seat, diametrically opposite said first valve seat, surrounding said second outlet, a valve member positioned in said valve chamber or movement between a first position in engagement with said first valve seat and a second position in engagement with second valve seat, actuator means with a timing valve means therewith including a switching diaphragm operatively connected to said valve member for effecting movement of said valve member between said first position and said second position, said actuator means further including first spring means operatively associated with said valve member to normally bias said valve member to said second position, said switching diaphragm being positioned in a first portion of said valve housing means to form therewith a first vacuum chamber on one side of said switching diaphragm and a first pressure chamber on the opposite side of said switching diaphragm, fluid passage means in said housing means in communication at one end with said first pressure chamber and at its other end in communication with said inlet, a first vacuum post means in said housing means opening into said first vacuum chamber and connectable to the engine induction system, a first valve means operatively positioned in said housing means for movement to control fluid flow through said fluid passage means into said first chamber, said first valve means including a second actuator means having a second diaphragm forming with a second portion of said housing means a second chamber on one side of said diaphragm and located next opposite side next adjacent said first chamber, said second chamber being in communication with the atmosphere, and a second vacuum chamber on the opposite side of said second diaphragm, a second vacuum port means in said housing opening into said second vacuum chamber and connectable at its opposite end to the induction system of the engine, said first valve means further including a second spring means operatively positioned on one side of said second diaphragm to normally bias said first valve means into a position permitting fluid flow through said fluid passage means into said first chamber, an atmospheric air inlet means in said second portion of said housing means in fluid communication at one end with said second vacuum chamber and, a second valve means operatively positioned in said housing means for movement to control fluid flow through said atmospheric air inlet means, said second valve means including a third actuator means having a third diaphragm forming with a third portion of said housing means a third pressure chamber on one side of said third diaphragm in communication with said atmospheric air inlet means and a third vacuum chamber on the opposite side of said third diaphragm, said third actuator means further including a third spring means operatively associated with said third diaphragm to normally effect movement of said second valve means to a position blocking flow through said inlet port means, a third vacuum port means in said third portion of said housing means opening at one end into said third vacuum chamber and at its other end being connectable to the induction system of the engine, and passage means in said housing means opening at one end into said third pressure chamber and in communication at its opposite end with the atmosphere.

2. An air control valve for use on an internal combustion engine having an induction system for air flow to the engine, a throttle in said induction system for controlling air flow therethrough, an exhaust system for exhaust flow from the engine, and a pump for delivering air to the exhaust system, said air control valve including an upper body means defining a passage means having an inlet for receiving air from the pump, an outlet for discharging air to the exhaust system, and a divert outlet aligned with said outlet for by-pass air flow, a valve member reciprocable between a first position obstructing air flow through said divert outlet while permitting air flow through said outlet and a second position obstructing air flow through said outlet while permitting air flow through said divert outlet, a first spring operatively positioned for biasing said valve member to said first position, a divert timing body secured to said upper body, a switching diaphragm operatively connected to said valve member and secured between said upper body and said divert timing body to define a first vacuum chamber with said upper body and a control chamber with said divert timing body, said first vacuum chamber having means associated therewith to sense the vacuum in the induction passage downstream of the throttle valve, said switching diaphragm having bleed means associated therewith for permitting restricted flow from said control chamber to said first vacuum chamber, a lower body secured to said divert timing body, a power mode diaphragm secured between said lower body and said divert timing body to define with said divert timing body a first atmospheric chamber, open to the atmosphere and with said lower body a second vacuum chamber, passage means in said divert timing body connecting said control chamber to said inlet, valve means connected to said power mode diaphragm for movement therewith between an unblocked position permitting flow through said passage means and a blocked position preventing flow through said passage means, a first calibrated spring means operatively positioned to normally bias said valve means to said unblocked position, said second vacuum chamber having means associated therewith to sense a vacuum signal delivered from the induction passage downstream of the throttle valve, a cover fixed to said lower body, a cruise control diaphragm secured between said lower body and said cover to define with said lower body a second atmospheric chamber open to the atmosphere and to define with said cover a third vacuum chamber connectable for receiving a vacuum signal from the induction passage downstream of the throttle valve, a second passage means in said lower body connecting said second atmospheric chamber with said second vacuum chamber, a second valve means operatively associated with said cruise control diaphragm for movement therewith between an open position and a closed position relative to said second passage means for controlling flow therethrough, and a second calibrated spring means operatively connected to said second valve means for biasing said second valve means to said closed position.

* * * * *